US010527389B2

(12) United States Patent
Martin et al.

(10) Patent No.: US 10,527,389 B2
(45) Date of Patent: Jan. 7, 2020

(54) PHOTOLUMINESCENT ILLUMINATORS FOR PASSIVE ILLUMINATION OF SIGHTS AND OTHER DEVICES

(71) Applicant: Defense Holdings, Inc., Manassas Park, VA (US)

(72) Inventors: Richard James Martin, Delaplane, VA (US); Gregory Louis Bender, Alexandria, VA (US); Thomas Wells Brignall, Jr., Marcellus, MI (US); Henry John Richert, Clover, SC (US)

(73) Assignee: Defense Holdings, Inc., Manassas Park, VA (US)

( * ) Notice: Subject to any disclaimer, the term of this patent is extended or adjusted under 35 U.S.C. 154(b) by 0 days.

(21) Appl. No.: 16/158,076

(22) Filed: Oct. 11, 2018

(65) Prior Publication Data

US 2019/0063873 A1 Feb. 28, 2019

Related U.S. Application Data

(63) Continuation of application No. 14/312,008, filed on Jun. 23, 2014, now Pat. No. 10,107,590, which is a continuation of application No. PCT/US2012/071643, filed on Dec. 26, 2012.

(Continued)

(51) Int. Cl.
*F41G 1/32* (2006.01)
*F41G 1/34* (2006.01)
(Continued)

(52) U.S. Cl.
CPC ............... *F41G 1/32* (2013.01); *F21V 13/14* (2013.01); *F41G 1/345* (2013.01); *G01B 11/02* (2013.01);
(Continued)

(58) Field of Classification Search
CPC . F41G 1/32; F41G 1/345; F21V 13/14; G01B 11/02; F21W 2131/40
(Continued)

(56) References Cited

U.S. PATENT DOCUMENTS 3,994,597 A * 11/1976 Calder ............... F41G 1/30
356/251
4,877,324 A * 10/1989 Hauri ............... G02B 23/10
356/251
(Continued)

FOREIGN PATENT DOCUMENTS

EP 0913448 A1 5/1999

OTHER PUBLICATIONS

Jason K., DuraCoat Stock Colors, Dec. 24, 2005, http://jimsgunsupply.com/DuraCoat/color.html, pp. 1-3.

*Primary Examiner* — Joshua E Freeman
*Assistant Examiner* — Bridget A Cochran
(74) *Attorney, Agent, or Firm* — Olive Law Group, PLLC

(57) ABSTRACT

A photoluminescent capsule illuminator for a sighting device. The photoluminescent illuminator includes an elongated phosphor housing having sidewalls and a base. The photoluminescent illuminator includes phosphors in a granular form disposed inside the phosphor housing. The photoluminescent illuminator includes a cap sealing the phosphors in the phosphor housing. The phosphor housing is disposed in relation to a body of the sighting device such that photoluminescent light emitted from the phosphors exits the phosphor housing and identifies a location of a sight on the sighting device.

19 Claims, 5 Drawing Sheets

Related U.S. Application Data

(60) Provisional application No. 61/579,881, filed on Dec. 23, 2011.

(51) Int. Cl.
    *F21V 13/14*     (2006.01)
    *G01B 11/02*     (2006.01)
    *F21W 131/40*     (2006.01)
    *F21Y 115/10*     (2016.01)

(52) U.S. Cl.
    CPC ...... *F21W 2131/40* (2013.01); *F21Y 2115/10* (2016.08)

(58) Field of Classification Search
    USPC .......................................................... 42/132
    See application file for complete search history.

(56) References Cited

U.S. PATENT DOCUMENTS

| | | | |
|---|---|---|---|
| RE33,485 E * | 12/1990 | Frimer | F41G 1/033 362/110 |
| 6,122,833 A * | 9/2000 | Lorocco | F41G 1/32 42/132 |
| 6,307,207 B1 * | 10/2001 | Burbank | A62B 3/00 250/462.1 |
| 6,385,855 B1 * | 5/2002 | Tymianski | F41G 1/345 33/263 |
| 7,562,486 B2 * | 7/2009 | LoRocco | F41G 1/345 42/132 |
| 8,189,967 B1 * | 5/2012 | Olson | F41G 1/35 385/12 |
| 8,831,392 B2 * | 9/2014 | Fukui | C09K 11/7706 385/129 |
| 2005/0012446 A1 * | 1/2005 | Jermann | C09K 11/7706 313/501 |
| 2007/0137090 A1 * | 6/2007 | Conescu | F41G 1/473 42/142 |
| 2008/0295380 A1 * | 12/2008 | Buckingham | F41G 1/345 42/131 |
| 2009/0013581 A1 * | 1/2009 | LoRocco | F41G 1/345 42/132 |
| 2010/0088944 A1 * | 4/2010 | Callihan | F41G 1/01 42/145 |
| 2011/0107650 A1 * | 5/2011 | Howe | F41G 1/10 42/132 |

* cited by examiner

SECTION A-A

PHOTOLUMINESCENT ILLUMINATORS FOR PASSIVE ILLUMINATION OF SIGHTS AND OTHER DEVICES

CROSS REFERENCE TO RELATED APPLICATIONS

This application is continuation of and claims priority to U.S. Ser. No. 14/312,008 (the entire contents of which are incorporated herein by reference) which is a continuation of PCT/US12/71643, filed Dec. 26, 2012, and claims priority to U.S. Ser. No. 61/579,881, filed Dec. 23, 2011.

BACKGROUND OF THE INVENTION

Field of the Invention

The present invention relates to photoluminescent illuminators providing passive illumination of sights and other devices especially in dark or low light ambient conditions. The photoluminescent illuminators of the invention permit objects to be viewed for relatively long durations in low ambient light environments and to be recharged quickly.

Discussion of Background

Aiming sights are commonly used as a reference indicia on various weaponry such archery bows, guns, mortar and artillery sights, etc. Archery sights usually have a bracket secured to a sight assembly on the bow to support vertically spaced sight elements extending cantilevered to an end adjacent a vertical sight plane. Each of the different sight elements typically represent distinct target distances from which the archer can select in the aiming of his arrow toward an intended target. For guns, the traditional iron sights have a pair of aligned sighting elements mounted in line with the gun barrel. For mortar and artillery sights, there are often indicia for azimuth and elevation and these indicia are illuminated using radioactive tritium capsule illuminators. Aiming sticks are stakes to be inserted in the ground for gunners to pre-register mortar aim-points. They are identified by color or by the number of night illuminators visible.

A variety of firearms such as for example rifles, shotguns, and pistols and other hand guns ("guns") are aimed at targets using some form of sighting device which is fixed to the weapon in alignment with the sight line of the gun barrel. While optical sights ("scopes") are frequently used, the advantage of iron sights is that the eye can quickly integrate the entire field of view with respect to the iron sight so as to rapidly locate the target and point the firearm in that direction. In low light conditions, this capability is compromised especially by the usual camouflaged or dark handgun, shotgun or rifle and the dark iron sights.

SUMMARY OF THE INVENTION

According to one embodiment of the invention, there is provided a photoluminescent capsule illuminator for a sighting device. The photoluminescent illuminator has an elongated phosphor housing having sidewalls and a base, phosphors in a granular form disposed inside the phosphor housing, and a cap sealing the phosphors in the phosphor housing. The phosphor housing is disposed in relation to a body of the sighting device such that photoluminescent light emitted from the phosphors exits the phosphor housing and identifies a location of a sight on the sighting device.

According to one embodiment of the invention, there is provided a method for locating an object in a low ambient light environment using a photoluminescent illuminator. This method transmits external light into the photoluminescent illuminator to charge phosphors in the photoluminescent illuminator. This method emits photoluminescent light from the phosphors to mark a position of the object in the low ambient light environment.

According to one embodiment of the invention, there is provided a method for illuminating of an object. The method transmits external light into the photoluminescent illuminator to charge phosphors in the photoluminescent illuminator. This method emits photoluminescent light from the phosphors to illuminate the object.

It is to be understood that both the foregoing general description of the invention and the following detailed description are exemplary, but are not restrictive of the invention.

BRIEF DESCRIPTION OF THE FIGURES

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
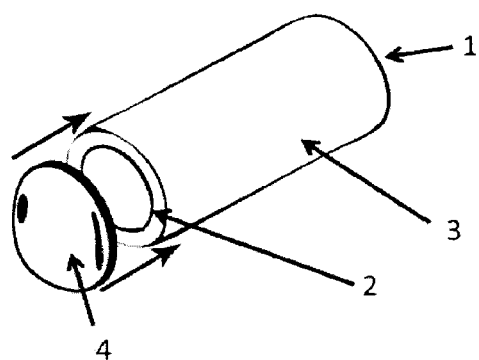
FIG. 1 is a perspective view of one embodiment of this invention showing an elongated phosphor housing for a gun sight and an optically transparent cap on the front of the elongated phosphor housing that may be configured to serve as a lens.

For the purpose of this invention, the term "passively charged" refers to the charging of non-radioactive photoluminescent materials by exposure to natural or artificial light sources. An example of passively charging a photoluminescent material using natural or artificial light is described below.

For the purposes of this invention, the term "photoluminescent material" refers to any item exhibiting photoluminescent characteristics.

For the purposes of this invention, the term "photoluminescent characteristics" refers to an item's ability to absorb light and later emit light, such as for example, during low light or darkened conditions.

For the purposes of this invention, the term "low ambient light environment: refers to nighttime, dusk, dawn, or conditions where natural or artificial illumination such as from powered light sources are not present.

For the purposes of this invention, the term "phosphors" refers to any material, especially in powder, granular, or crystalline form exhibiting photoluminescent characteristics. Examples of phosphors known in the art and suitable for this invention include: oxides, nitrides and oxynitrides, sulfides, selenides, halides or silicates of zinc, cadmium, manganese, aluminium, silicon, or various rare earth metals. Activators in these materials such as zinc and copper prolong the emission time or afterglow.

In one embodiment of this invention, the phosphors are made of strontium aluminate (referred to herein as "SrAl") or strontium magnesium (referred to herein as "SrMg") materials. SrAl is a combination of Strontium, Aluminum, and Oxygen. For example, in an embodiment the phosphors include $SrAl_2O_4$ phosphor crystals. Further, in an embodiment, the $SrAl_2O_4$ crystals are doped with rare earth elements, such as, for example, lanthanides (e.g., Europium, Cerium, Holmium, Samarium, Erbium), and/or Yttrium. Europium doped $SrAl_2O_4$ emits a green light with a wavelength of approximately 520 nm. In another embodiment, the phosphors may be an alumina silicate based material. In another embodiment, the phosphors can be a mixture of different phosphors or phosphors and fluorescent materials such that the "color" or wavelength of light emitted or perceived to be emitted can be changed.

Depending on the specific properties desired, the specific composition of the phosphor composition may be varied. For example, the concentration of SrAl crystals and/or the size of the SrAl crystals may be varied to achieve different results. In general, increasing the concentration of SrAl crystals, their size, or both results in both increased luminance performance. However, it also generally increases costs. Additionally various additives may be added to the composition to enhance durability, maximize clarity, or change the effective color.

Strontium aluminate (SRA, SrAl, SrAl2O4) is a solid odorless, nonflammable, pale yellow powder, heavier than water. It is chemically and biologically inert. When activated with a suitable dopant (e.g. europium, then it is labeled SrAl2O4:Eu), it acts as a photoluminescent phosphor with long persistence of phosphorescence.

Strontium aluminate is a vastly superior phosphor to its predecessor, copper-activated zinc sulfide; it is about 10 times brighter and 10 times longer glowing, however about 10 or more times more expensive than ZnS:Cu. Because strontium aluminate phosphors are doped with rare earth metals, phosphor costs tend to fluctuate with the costs of rare earth metals.

Strontium aluminate is very hard, causing abrasion to the machinery handling it. Often strontium aluminate particles are coated with a suitable lubricant before being added to plastics. Many times the internals of equipment used in processing strontium aluminate are coating with a hard-surface material to prevent erosion of the equipment and contamination o the phosphors.

Strontium aluminate phosphors produce green and aqua hues, where green gives the highest brightness and aqua the longest glow time. The excitation wavelengths for strontium aluminate range from 200 to 450 nm. The wavelength for its green formulation is 520 nm, its blue-green version emits at 505 nm, and the blue one emits at 490 nm. Colors with longer wavelengths can be obtained from the strontium aluminate as well, though for the price of some loss of brightness.

The wavelengths produced depend on the internal crystal structure of the material. Slight modifications in the manufacturing process (the type of reducing atmosphere, small variations of stoichiometry of the reagents, addition of carbon or rare-earth halides) can significantly influence the emission wavelengths and thus the colors.

Strontium aluminate phosphor is fired at about 1250° C. Subjecting it to temperatures above 1090° C. is likely to cause loss of its phosphorescent properties.

The intensity of the afterglow depends on the particle size; generally, the bigger the particles, the better the glow.

In general, there is provided in this invention a photoluminescent capsule illuminator for a sighting device. The photoluminescent illuminator has an elongated phosphor housing having sidewalls and a base, phosphors in a granular form disposed inside the phosphor housing, and an optically transparent cap sealing the phosphors in the phosphor housing. The phosphor housing disposed in relation to a body of the sighting device (such as for example as a surface-mounted illumination source or in a cavity within the body of a sight attached to the sighting device) such that light emitted from the phosphors identifies a location of the sight.

In one embodiment, the phosphors noted above are incorporated into photoluminescent illuminators of this invention for passive illumination of fixed, non-optical "iron" sights for firearms of all types and other sighting devices such as mortar and artillery sights, bow sights, sighting sticks, compasses and other devices. In particular, the photoluminescent illuminators of this invention can be used in any other applications where replacement of radioactive tritium capsule illuminators with safe, non-toxic, non-radioactive illumination sources may be desired. The photoluminescent illuminators permit the sights on these devices to be viewed for relatively long durations in low ambient light environments and recharged quickly.

The photoluminescent illuminators of the invention can be used for fixed, non-optical, blade front sight and notch or "V" rear sights ("iron" sights) for firearms of all types and other sighting devices such as mortar and artillery sights, bow sights, sighting sticks, compasses, optical and laser rangefinders, navigational equipment, surveying equipment, coarse aiming devices for celestial and spotting telescopes and similar devices, and any other applications where safe, reliable, non-toxic, non-radioactive illumination sources may be desired including where replacement of radioactive tritium capsule illuminators is desired. Photoluminescent illuminators permit the sights and indicia on these devices to be viewed for relatively long durations in low ambient light environments and recharged quickly.

FIG. 1 is a perspective view of one embodiment of this invention showing an elongated phosphor housing 1 for a gun sight. The phosphor housing 1 includes sidewalls 2 shown here for the sake of simplicity as tubular walls but not so restricted to the cylindrical shape. The housing 1 could be rectilinear, polygonal, elliptical, or any other closed shape.

The housing 1 could include slots or slits in the walls of the housing. The housing 1 (including the sidewalls and base) in one embodiment is made of a transparent material such as for example glasses or plastics.

For the purpose of this invention, the term "transparent" refers broadly to a material which does not absorb a substantially large amount of light such as for example plastics or glasses which, although not optically clear due to light scattering, are considered "translucent" and transmit no more than 5% of incident light therethrough. These materials nevertheless have utility in providing "charging" light to the phosphors. The term "transparent" also includes materials such clear plastics and clear glasses that are highly transparent transmitting more than 50% of incident light therethrough with minimum scattering.

The housing 1 in one embodiment is molded or otherwise fabricated from a white polymeric material. The housing 1 in one embodiment includes a reflective coating 3 disposed on the outside wall 2 of the housing 1 which serves both to direct light into the elongated phosphor housing to charge the phosphor particles and to propagate photoluminescent light emitted from the phosphors out of the elongated phosphor housing. In one embodiment of this invention, the reflective coating 3 can be a metallic coating or a white paint. The open end of the elongated phosphor housing is covered with transparent cap 4 formed from a drop of optically clear epoxy material that serves both as a closure to retain the phosphor particles and as a lens to focus the light emitted by the phosphor particles.

Figure 2:
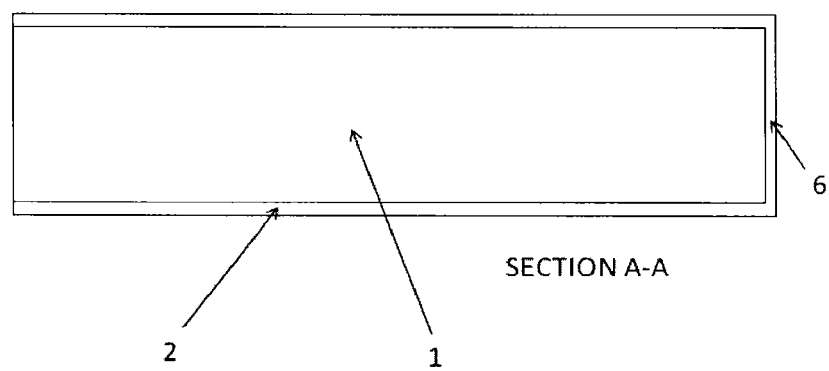
FIG. 2 is a cross-sectional view along a longitudinal axis the elongated phosphor housing.

FIG. 2 is a cross-sectional view along a longitudinal axis the elongated phosphor housing 1. This view shows the confinement of phosphors 5 by the sidewall 2 and the base 6 of the elongated phosphor housing 1 and the transparent cap 4. The base 6 in one embodiment includes a reflective coating 7 (which may be the same coating as reflective coating 3 disposed on the outside of the base 6 which serves to reflect photoluminescent light emitted from the phosphors 5 back out of the elongated phosphor housing. In one embodiment the end opposite the open end of the capsule is closed by a continuation of the molded sidewalls. In another embodiment, it is closed by means of a separately applied white epoxy. In one embodiment of this invention, the reflective coating 3 and 7 can be a metallic coating or a white paint. In one embodiment of this invention, transparent cap 4 is made from a curable, optically-clear epoxy applied over the end of the phosphor housing 1 once the phosphors are loaded therein.

In one embodiment of this invention, the transparent cap 4 is shaped to form a lens. The lens in one embodiment is a focusing lens imaging the cap at an image distance of one meter, a typical distance from a shooter to a hand gun or a typical distance from a shooter to a rear rifle sight. The transparent cap 4 in one embodiment is a focusing lens imaging the cap at an image distance of 10 cm, a typical distance from a shooter to a front rifle sight. The transparent cap 4 in one embodiment is a collimating lens collimating light from the phosphor housing 1 in a substantially non-diverging beam. In one embodiment, a molded lens serving as the transparent cap 4 having the desired shape can be epoxied onto the end of the elongated phosphor housing 1. In another embodiment, the surface tension, amount of epoxy applied, and intensity of ultraviolet causing the epoxy to cure can be adjusted to form a shape of the required curvature of the transparent cap 4 to approximate a lens.

Techniques for forming lens elements from plastics and epoxies are described for example in U.S. Pat. Nos. 5,374,668; 6,153,719; and 7,023,622 and in U.S. Pat. Appl. Publ. No. 2011/0194186. Resin formulations that have minimal birefringence are described in U.S. Pat. No. 6,445,513. Each of the patents and patent applications are incorporated herein in their entirety. These techniques and materials for the fabrication of lens elements are suitable for the present invention.

U.S. Pat. No. 5,374,668 describes a polysulfide based resin lens, which would be suitable for the present invention. One polysulfide based resin lens described therein and suitable for the present invention is a mixture of an epoxy resin, a polythiol compound, and an internal releasing agent, which is cast polymerized. The polysulfide based resin lens describe therein provides excellent opticophysical properties and a high surface accuracy without special surface treatments. One polysulfide based resin lens described therein and suitable for the present invention is a mixture of an epoxy and/or episulfide resin having at least two epoxy groups and/or episulfide groups, and at least one polythiol compound having at least two mercapto groups, and at least one internal releasing agent.

U.S. Pat. No. 6,153,719 describes a composition suitable for the present invention and including an epoxy compound, a thiol curing agent, a catalyst or accelerator and a phosphorus-containing, adhesion-promoting compound having at least one P—OH group and at least one organic moiety characterized by the presence of an ethylenically unsaturated group.

U.S. Pat. No. 7,023,622 describes ways to make lens elements for miniature microscopes with a description of the fabrication and design criteria for mm-size optical elements, which would be suitable for the present invention. U.S. Pat. Appl. Publ. No. 2011/0194186 describes a method for manufacturing a polymer miniature lens, which would be suitable for the present invention.

Figure 3:
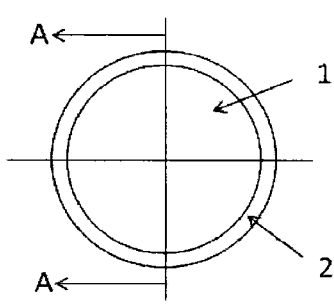
FIG. 3 is an end view of the elongated phosphor housing showing the sidewalls containing the phosphors.

FIG. 3 is an end view of the elongated phosphor housing 1 showing the sidewall 2 containing the phosphors 5. In one embodiment of this invention, the phosphors 5 are loaded into the housing 1 without any polymer fill between the crystals. In another embodiment, phosphors 5 are loaded into the housing 1 with an optically matching (i.e., index of refraction matching) fluid filling the space between the crystals to minimize light scatter. Suitable fluids for this invention include but are not limited to "FC-43" or "FC-104" which are general purpose perfluorocarbon fluids manufactured by the 3M Company. DECALIN or decahydronaphthalenel, a fluid manufactured by Eastman Kodak Company.

Figure 4:
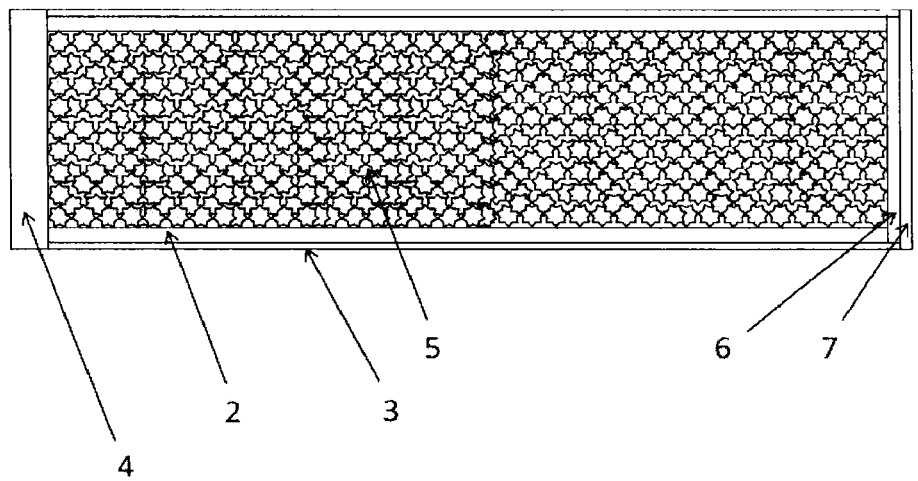
FIG. 4 is a cross-sectional view along a longitudinal axis the elongated phosphor housing showing the phosphors, reflective coatings and a transparent cap.

FIG. 4 is a side view of the elongated phosphor housing 1 showing the reflective coating 3 disposed on the outside of the wall 2 as well as a flat cap 4 of optically transparent epoxy.

Figure 5:
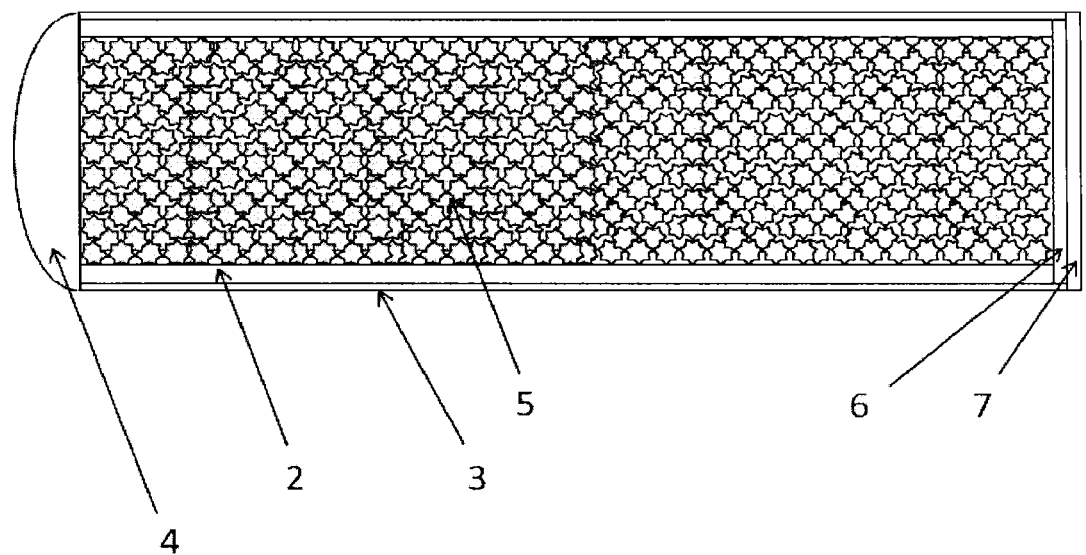
FIG. 5 is a cross-sectional view along a longitudinal axis the elongated phosphor housing showing the phosphors, reflective coatings and a transparent cap disposed as a large radius lens.

FIG. 5 is a view of the elongated phosphor housing 1 showing the end cap 4 of the optically transparent epoxy formed as a lens with a relatively larger radius.

Figure 6:
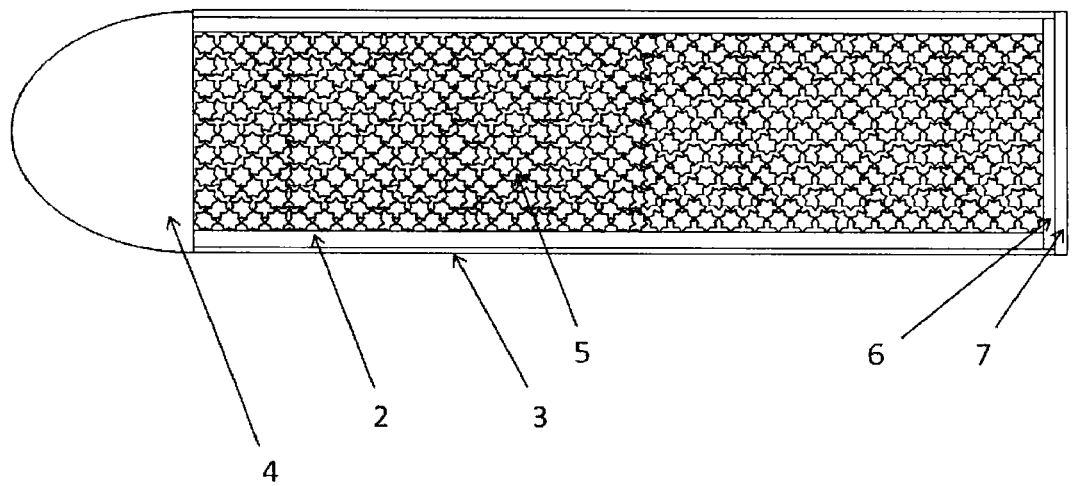
FIG. 6 is a cross-sectional view along a longitudinal axis the elongated phosphor housing showing the phosphors, reflective coatings and a transparent cap disposed as a small radius lens.

FIG. 6 is a view of the elongated phosphor housing 1 showing the end cap 4 of the optically transparent epoxy formed as a lens with a relatively smaller radius.

Figure 7:
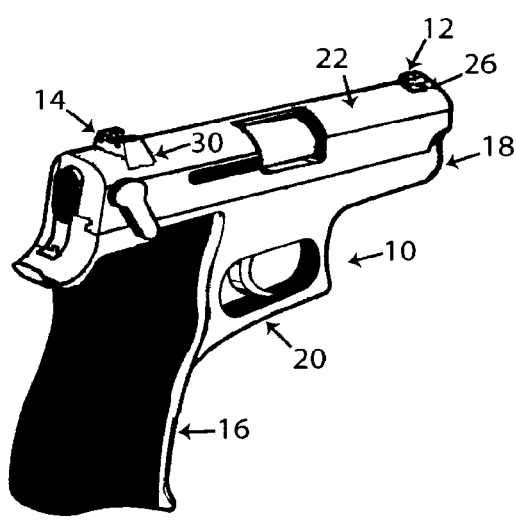
FIG. 7 is a schematic showing the phosphor housing disposed in a body of a sight attached to a sighting device of a handgun.

FIG. 7 is a schematic showing the phosphor housing 1 disposed in a body of front blade sight 12 attached to a sighting device 26 and a body of rear notch sight 14 attached to a sighting device 30 such that light emitted from the phosphors identifies a location of the sight. In FIG. 7, a typical handgun 18 is shown having aiming sights (i.e., a sighting device) including a front sight blade 12 and a rear notch sight 14. The handgun 18 has a handle 16, a lower receiver 18 a typical trigger mechanism 20, and a slide 22 slidably supported on the lower receiver 18. Details of a typical handgun and are found in U.S. Pat. No. 5,065,519, the entire contents of which are incorporated herein by reference.

Figure 8:
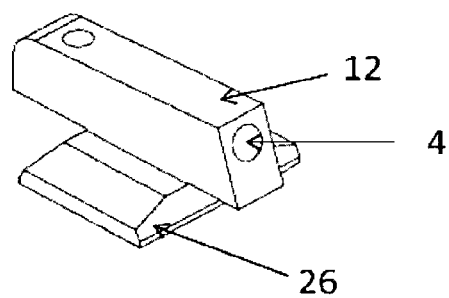
FIG. 8 is a pictorial view of the front sight blade assembly of the handgun.

The front sight blade 12 is located at the front of the slide 22 while the rear notch sight 14 is located at the rear of the slide 22. The front blade 12 shown in FIG. 8 has a mounting base 26 which is wedge shaped or angulated at its sides to provide for a press fitted dovetail type assembly in a slot at the forward end of slide 22. In similar fashion the rear notch sight 14 has a mounting base 30 which is wedge shaped or angulated at its sides to provide for a press fitted dovetail type assembly in a slot at the rearward end of slide 22.

In one embodiment, the front blades are made integral with the slide or main gun barrel.

For purposes of durability and strength the front and rear notch sight 12 and 14, respectively, and the slide 22 are made of a strong, durable metal, i.e. heat treated, hardened steels.

Figure 9:
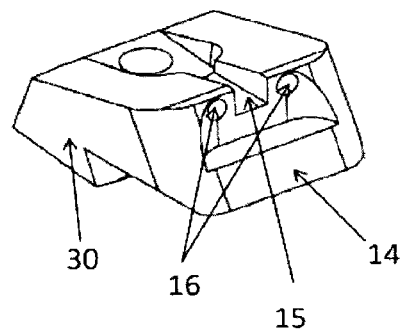
FIG. 9 is a pictorial view of the rear notch sight assembly of the handgun.

As noted, night sighting is provided by the phosphor housing 1 of this invention used as an insert assembly. As in the embodiment of FIG. 9, the rear notch sight 14 has a center notch (such as notch 15 in FIG. 9) and a pair of bores 16 on opposite sides thereof. The bores 16 house the phosphor housing 1. The bores 16 can be vented from the back side to allow for curing of an adhesive holding the phosphor housings 1 in the bores 16. The phosphor housing 1 have their transparent caps 4 facing outward. The transparent caps can be focusing lens having an image distance set to an average distance from a handgun to an eye of a shooter. The transparent caps can be focusing lens having an image distance set to an average distance from a front rifle sight to an eye of a shooter. The transparent caps can be focusing lens having an image distance set to an average distance from a rear rifle sight to an eye of a shooter.

For assembly purposes the rear sight blade 14 is provided with a base 30 having wedge shaped or angulated sides to facilitate a press fitted dovetail type assembly.

In one embodiment of the invention, the above noted illuminators are used to locate an object in a dark or low light environment. In this embodiment, external light to the illuminator is transmitted for example through a transparent cap or transparent sidewalls of the photoluminescent illuminator to charge the phosphors in the phosphor housing. The illuminator (disposed in relation to a body of the object) has preferably but not necessarily an elongated phosphor housing. Phosphors in a powder and/or granular form are disposed inside the phosphor housing. The cap seals the phosphors in the phosphor housing. In this embodiment, photoluminescent light emitted from the phosphors (and transmitted through for example a transparent cap or a transparent sidewall) marks a position of the object in the dark or low light environment.

Figure 10:
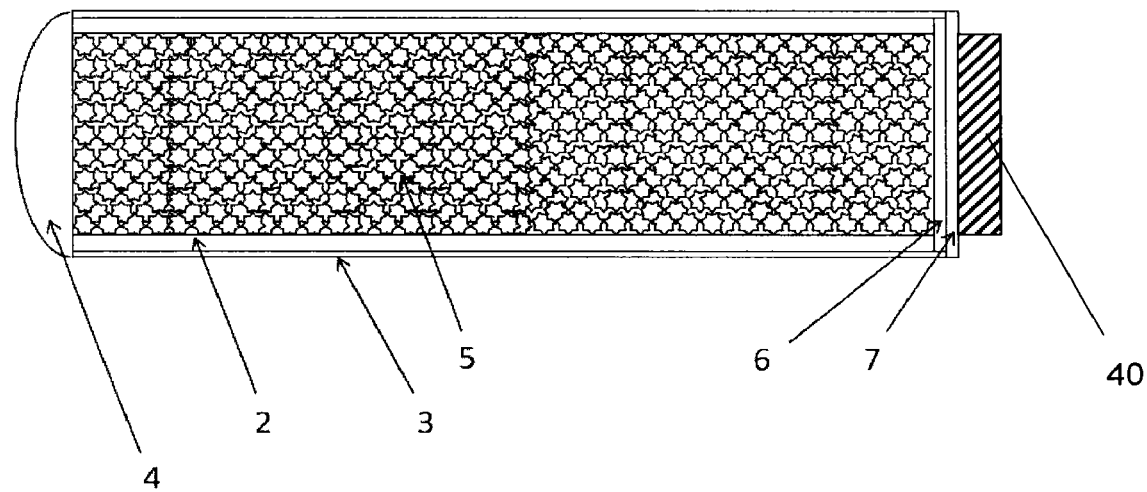
FIG. 10 is a schematic of a photoluminescent illuminator of the present invention with an ultraviolet source located near the base of the housing.

In this embodiment of the invention and others, an ultraviolet light source such as a UV LED can be used to charge, re-charge, or keep charged the phosphors in the photoluminescent illuminator. In one embodiment, an ultraviolet light source 40 such as a UV LED is connected to the phosphor housing 1 as shown in FIG. 10. FIG. 10 is a schematic of a photoluminescent illuminator of the present invention with an ultraviolet source located near the base, although other locations on the housing are suitable. In another embodiment, the ultraviolet light source 40 can be located remote from the housing. In another embodiment, the ultraviolet light source 40 can be installed inside the housing. In these and other embodiments, the phosphor housing 1 may be attachable/detachable from the object which is to be illuminated to facilitate interchange or replacement of different units. In these and other embodiments, the cap 4 may be attachable/detachable from the phosphor housing 1 to facilitate interchange or replacement of different lens elements.

In this embodiment, the illuminator can include any of the features described above and can perform the functions noted above. In this embodiment, the illuminator can include any or all of a transparent cap, a transparent side wall, and/or a transparent base.

In one embodiment of the invention, the above noted illuminators are used to illuminate an object. In this embodiment, external light to the illuminator is transmitted for example through a transparent sidewall or a transparent cap of a photoluminescent illuminator. The illuminator (disposed in relation to a body of the object) has preferably but not necessarily an elongated phosphor housing. Phosphors in a powder or granular form are disposed inside the phosphor housing. The cap seals the phosphors in the phosphor housing. In this embodiment, the phosphors in the photoluminescent illuminator are charged by exposure of the illuminator to an external light source, and external light transmitted for example through the transparent cap or the transparent sidewall charges the phosphors. In this embodiment, photoluminescent light emitted from the phosphors (and transmitted through at least one of the transparent cap and the transparent sidewalls) illuminates the object.

In this embodiment, the illuminator can include any of the features described above and can perform the functions noted above. In this embodiment, the illuminator can include any or all of a transparent cap, a transparent side wall, and/or a transparent base.

In one embodiment of the invention, a photoluminescent capsule illuminator is provided which includes an elongated phosphor housing having sidewalls and a base. The photoluminescent illuminator includes phosphors in a granular form disposed inside the phosphor housing. The photoluminescent illuminator includes a cap sealing the phosphors in the phosphor housing. The phosphor housing is disposed in relation to a body of an object to be illuminated such that photoluminescent light emitted from the phosphors is emitted from the phosphor housing.

In this embodiment, the illuminator can include any of the features described above and can perform the functions noted above. In this embodiment, the illuminator can include a transparent cap, a transparent side wall, and/or a transparent base. In this embodiment, the illuminator may include an opaque cap and a transparent side wall, or a transparent cap and an opaque side wall, or an opaque base and a transparent side wall, or a transparent base and an opaque side wall.

Accordingly, a variety of applications such as those described above can utilize the photoluminescent illuminators of the invention to illuminate objects or mark objects in a low light or dark environment.

Figure 11:
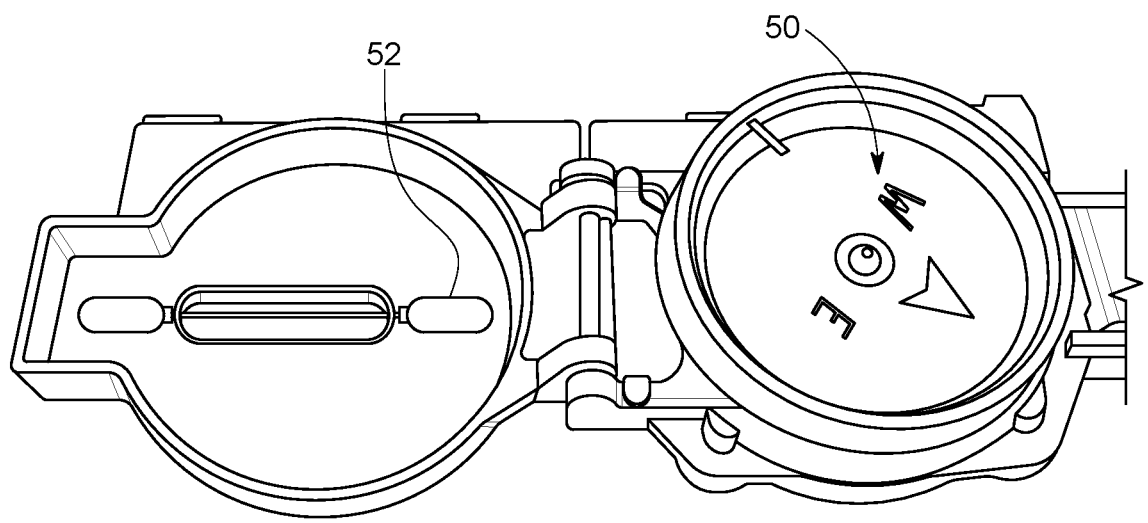
FIG. 11 is a photographic depiction the photoluminescent illuminators of this invention mounted in an instrument housing.

FIG. 11 is a photographic depiction of photoluminescent illuminators 50 of this invention mounted in an instrument housing opposite an instrument face 53 of a compass. More details of this application are described in "Method of Illuminating a Magnetic Compass or Other Type of Indicia in Low Light Situations Using Photoluminescent Materials, U.S. Ser. No. 61/256,891, the entire contents of which are incorporate by reference. In the present invention, illumination of a magnetic navigational compass or any similar instrument device can occur using multiple ones of the photoluminescent illuminators 50 constructed as described above. In these applications, the photoluminescent illuminators 50 replace the photoluminescent disk and rod(s) in the '891 application that were made from polypropylene or other polymeric material incorporating photoluminescent pigments into the polymeric material.

Figure 12:
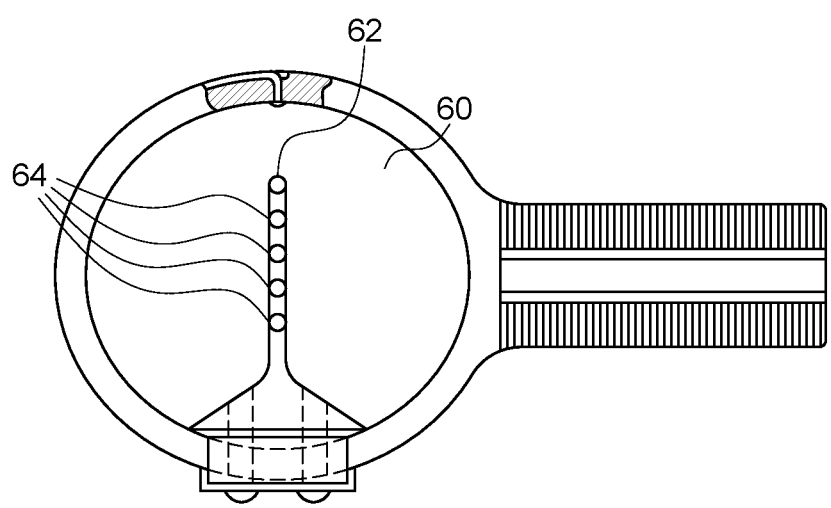
FIG. 12 is a schematic depicting a bow sight field of view with a sight lined up vertically and denoted by the photoluminescent illuminators of this invention.

Additionally, the photoluminescent illuminators of this invention can be used as indicators/reference points/aim points/orientation points/etc. where the human eye needs cueing in the dark. FIG. 12 is a schematic depicting a sight having a field of view 60 with a sight marker 62 (for example on a bow sight or other aiming device) lined up vertically and illuminated by the photoluminescent illuminators 64 of this invention thereby marking and identifying the sight 62. Specifically, in this embodiment, photoluminescent illuminators 64 of this invention are utilized to denote the sight 62 in the field of view under low light conditions. In one embodiment, the sight need not have a vertical sight marker but can be aligned at any predetermined angle.

Other applications for the photoluminescent illuminators of this invention include photoluminescent markers for outline marking of a targeted area (such as for example a landing site), trench identification, path or trail marking, spot marking, and mine marking. The photoluminescent illuminators of this invention can function as self-luminous route markers which can be placed on objects along roads and trails to mark the pathway, without need for power. Since the photoluminescent illuminators of this invention can have color dopants added (as noted above), these markers can be a visibly colored marker in daylight which is readily discernable from the background, while being self-illuminating at dusk and night.

Such self-illuminating photoluminescent illuminators of this invention can also be used in airplanes- or helicopter-instruments, for rifle or mortar scopes, vehicles markings, military transport land and nautical vehicles such as for example tanks and underwater vehicles where rarely would outside light be available to assist operators should there be power interruption.

Numerous modifications and variations of the invention are possible in light of the above teachings. It is therefore to be understood that within the scope of the appended claims, the invention may be practiced otherwise than as specifically described herein.

The invention claimed is:

1. A photoluminescent sighting device for a firearm barrel, comprising:
   a sight mounted to the firearm barrel; and
   a photoluminescent illuminator disposed on the sight facing a rear of the firearm barrel, said photoluminescent illuminator comprising phosphors and no radioactive material,
   wherein photoluminescent light emitted from the phosphors identifies a location of the sight on the firearm barrel,
   wherein the photoluminescent illuminator comprises:
   a capsule comprising an elongated phosphor housing for containing the phosphors on the front sight, the housing having sidewalls and a base, wherein the phosphors are in a powder or granular form disposed inside the phosphor housing.

2. The device of claim 1, wherein at least a part of the housing comprises a white polymeric material.

3. The device of claim 1, wherein at least a part of the housing comprises a polymeric material having a preselected color comprising at least one of a red color, a yellow color, a green color, or a blue color.

4. The device of claim 1, further comprising a reflective coating disposed on the outside of the sidewalls.

5. The device of claim 4, wherein the reflective coating comprises a metallic coating or a white paint.

6. The device of claim 1, wherein the base comprises a reflective coating.

7. The device of claim 6, wherein the reflective coating comprises a metallic coating or a white paint.

8. The device of claim 1, wherein the phosphors are selectable to emit different wavelengths of light.

9. The device of claim 1, wherein the phosphors comprise at least one oxides, nitrides, oxynitrides, sulfides, selenides, halides or silicates of zinc, cadmium, manganese, aluminum, silicon, rare earth metals, strontium aluminate, and strontium magnesium.

10. The device of claim 1, wherein the phosphors are disposed inside a housing without polymer fill between crystals of the phosphors therein.

11. The device of claim 1, further comprising a transparent cap disposed over the phosphors and shaped to form a lens.

12. The device of claim 11, wherein the transparent cap comprises at least one of a focusing lens and a collimating lens.

13. The illuminator of claim 1, wherein the phosphors comprise passively charged phosphors.

14. The illuminator of claim 13, wherein the passively charged phosphors comprise at least one of strontium aluminate and strontium magnesium.

15. The illuminator of claim 1, wherein the sight comprises a front sight for the firearm barrel.

16. The illuminator of claim 1, wherein the sight comprises a rear sight for the firearm barrel.

17. The illuminator of claim 1, wherein the photoluminescent illuminator forms at least one of a capsule, a rod, an aiming point, or reference point on the sight.

18. The illuminator of claim 1, further comprising a reflective coating provided with the photoluminescent illuminator.

19. The illuminator of claim 1, wherein the photoluminescent illuminator emits the photoluminescent light toward the rear of the firearm.

* * * * *